(12) United States Patent
Takayanagi et al.

(10) Patent No.: US 6,688,769 B2
(45) Date of Patent: Feb. 10, 2004

(54) SLIDING BEARING APPARATUS

(75) Inventors: Satoshi Takayanagi, Nagoya (JP);
Hideo Ishikawa, Nagoya (JP);
Takayuki Shibayama, Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 23 days.

(21) Appl. No.: 10/094,996

(22) Filed: Mar. 12, 2002

(65) Prior Publication Data
US 2002/0164098 A1 Nov. 7, 2002

(30) Foreign Application Priority Data
Mar. 15, 2001 (JP) .......................................... 2001-073904

(51) Int. Cl.⁷ .................................................. F16L 9/04
(52) U.S. Cl. ..................... 384/276; 384/294; 384/907.1
(58) Field of Search ............................ 384/907.1, 457, 384/294, 276, 288, 297, 429, 430, 434

(56) References Cited

U.S. PATENT DOCUMENTS

| | | | | | |
|---|---|---|---|---|---|
| 5,700,093 | A | * | 12/1997 | Hiramatsu et al. | 384/276 |
| 5,803,614 | A | * | 9/1998 | Tsuji et al. | 384/276 |
| 6,012,850 | A | * | 1/2000 | Kagohara et al. | 384/276 |
| 6,178,639 | B1 | * | 1/2001 | Lytwynec et al. | 384/294 |
| 6,357,918 | B1 | * | 3/2002 | Kagohara et al. | 384/276 |

* cited by examiner

*Primary Examiner*—Thomas R. Hannon
(74) *Attorney, Agent, or Firm*—Browdy and Neimark

(57) ABSTRACT

A sliding bearing apparatus having a superior resistance to fretting comprising: a sliding bearing provided with a back metal layer having an inner face and a rear face, and a bearing alloy layer provided on an inner face of said back metal layer; and a housing having an inner face on which said sliding bearing is mounted, the rear face of said back metal layer and/or the inner face of said housing being provided with a coating made of a ceramic.

20 Claims, 2 Drawing Sheets

SLIDING BEARING APPARATUS

BACKGROUND OF THE INVENTION

The present invention relates to a sliding bearing apparatus having an excellent resistance to fretting.

In recent years, for the purpose of weight-saving or the like, a housing to which a sliding bearing is mounted is designed to have a thin thickness or to be made of an aluminum alloy, so that the rigidity thereof is reduced. Thus, in the housing, small, repetitive strains are apt to occur easily in correspondence with dynamic loads applied thereto. For example, in the bearing housing such as a large end portion of a connecting rod and a main bearing portion in an engine for a motor car, since the weight saving design explained above is adopted, relative micro-collisions and/or micro-slips occur between the inner, peripheral surface of the bearing housing and the rear face of the sliding bearing mounted on the inner face of the bearing housing in correspondence with the repetitive strains of the bearing housing, so that there occurs such a state as a damage due to the fretting abrasion is apt to be caused.

Conventionally, as a countermeasure to address the problem of the fretting, there has been known a technique of coating a resin material having an excellent lubricity such as, for example, a polytetrafluoroethylene (PTFE) on the rear face of the sliding bearing, or applying a metal plating such as a copper, a nickel or the like thereto.

SUMMARY OF THE INVENTION

In the sliding bearing apparatus in which the PTFE is coated, there can be obtained an effect of preventing the fretting from occurring at an early stage under the operation of the sliding bearing. However, the PTFE is apt to be worn away, so that there is a problem that it lacks the reliability insofar as the long-term resistance to fretting is concerned. Further, in the sliding bearing apparatus in which the plating layer of a metal such as copper, nickel or the like is applied, an adhesion phenomenon is apt to occur between the metal plating layer and the housing, so that there is another problem that the satisfactory resistance to fretting can not be obtained.

The present invention is achieved by taking the matters explained above into consideration, and an object of the invention is to provide a sliding bearing apparatus in which a layer provided for the purpose of preventing a fretting from occurring hardly causes the abrasion or the adhesion and in which an excellent resistance to fretting can be maintained for a long period of time.

According to the first aspect of the invention, there is provided a sliding bearing apparatus comprising: a sliding bearing having a back metal layer provided with an inner face and a rear face, and a bearing alloy layer bonded to the inner face of the back metal layer; a housing having an inner face onto which the sliding bearing is fitted, the rear face of the back metal layer and/or the inner face of the housing being provided with the layer of a ceramic material bonded thereto. Since, in general, ceramics has low coefficient of friction and are hardly adhered, they have superior resistance to fretting. Further, they are hard in hardness and are hardly worn, it is possible to maintain an excellent resistance to fretting for a long period of time.

According to the second aspect of the invention, there is provided a sliding bearing apparatus as set forth in the first aspect in which apparatus the ceramic material is selected from the group consisting of a nitride, a carbide, an oxide, a boride, a sulfide and a fluoride.

In this case, the ceramics is inferior in thermal conductivity. Thus, in a case where the layer of the ceramic interposed between the sliding bearing and the housing is thick in thickness, the heat dissipation from the sliding bearing to the housing is suppressed, so that the temperature of the sliding bearing is raised unfavorably. However, when the thickness of the layer of the ceramic is in the range of 0.05 to 5 μm, the effect thereof for dissipating the heat can be obtained.

That is, according to the third aspect of the invention, there is provided a sliding bearing apparatus as set forth in the first aspect in which apparatus the thickness of the ceramic layer is in the range of 0.05 to 5 μm.

In prior arts, the thickness of the PTFE layer inferior, similarly to the ceramic materials, in thermal conductivity is 30 μm, and the thickness of the metal plating layer such as the copper, the nickel or the like is about 5 μm. In comparison with these cases of the prior arts, the thickness of the ceramic layer is thin in thickness, so that it is possible to enhance the heat dissipation of the sliding bearing and to thereby improve the bearing properties of the sliding layer.

DESCRIPTION OF THE PREFERRED EMBODIMENTS

An embodiment of the invention is described below in which a sliding bearing apparatus is used regarding a crank pin of an engine, while referring the drawings.

Figure 2:
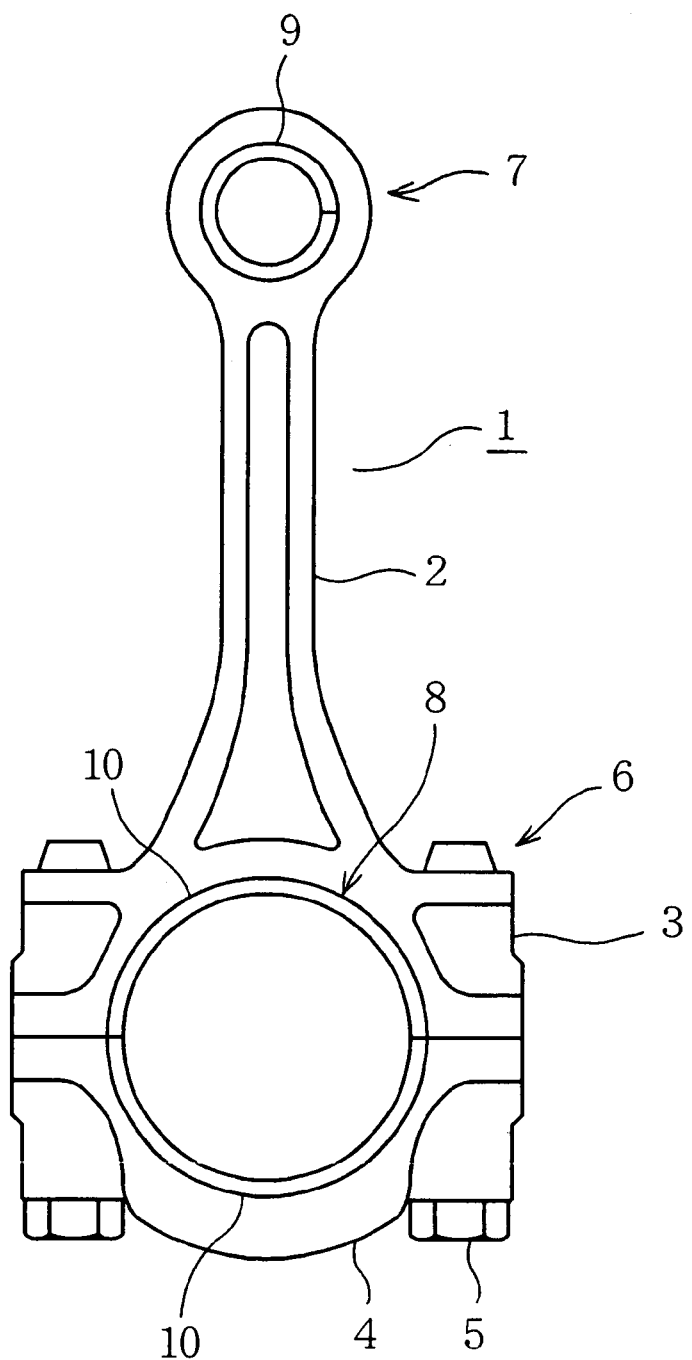
FIG. 2 is a front elevational view of a connecting rod in which the sliding bearing apparatus is mounted.

A connecting rod of an engine for a motor car is shown in FIG. 2. In both end portions of the connecting rod, as is well known, a side connected to a piston pin is called a small end portion and another side connected to the crank pin is called a large end portion. The connecting rod 1 shown in FIG. 2 is provided with a cap 4 fixed to one wide end portion 3 of a rod main body 2 by bolts 5.

Each of both of the large end portion 6 constituted by one end portion 3 of the rod main body 2 and by the cap 4 and the small end portion 7 corresponding to another end portion of the rod main body 2 acts as a bearing housing. In the large end portion 6 is arranged a bearing 8 for the crank pin, and a bearing 9 for the piston pin is arranged in the small end portion 7. The crank pin bearing 8 relating to the invention is constructed by vertically abutted, two sliding bearing portions 10 (hereinafter, refer to as half bearings) each formed to have a semi-cylindrical shape.

Figure 1:
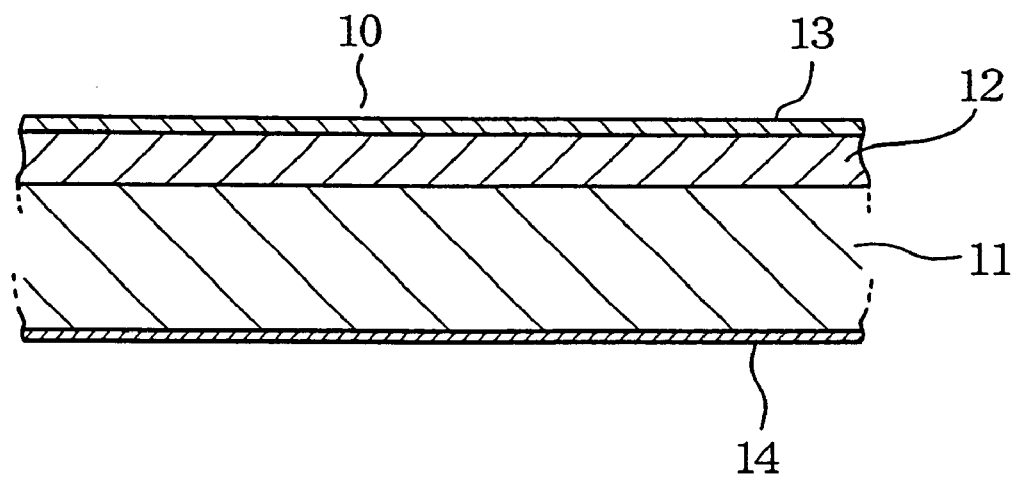
FIG. 1 is a cross sectional view of a part of a sliding bearing apparatus embodying the invention.

The half bearing 10 is provided with, as shown in FIG. 1, a back metal layer 11 having an inner face and a rear face, a bearing alloy layer bonded onto the inner face of the back metal which bearing alloy layer is made of a Cu-based alloy or an Al-based alloy, an overlay 13 bonded onto the bearing alloy layer 12, and a ceramic layer 14 made of a ceramic which ceramic layer is bonded onto the rear face of the back metal layer. The ceramic used to form the ceramic layer 14 is selected from the group consisting of: a nitride such as AlN, $Si_3N_4$, TiN, CrN, BN, TiAlN, TiCrN, AlCrN, ZrN, NbN, TaN, or HfN etc.; a carbide such as SiC, TiC, WC, $B_4C$, NbC, TaC, or $Cr_3C$ etc.; an oxide such as $Al_2O_3$, $SiO_2$, $TiO_2$, ZnO, $WO_3$, $In_2O_3$, $SnO_2$, $Ta_2O_5$, $Fe_3O_4$, Co—$Al_2O_3$, Ti$_2$—ZnO$_2$, PbO—TiO$_2$, CoO—Al$_2$O$_2$—Cr$_2$O$_3$, Cr$_2$O$_3$—Sb$_2$O$_3$—TiO$_2$, or CoO—Cr$_2$O$_3$—MnO$_2$—Fe$_2$O$_3$ etc.; a boride such as TiB$_2$, ZrB$_2$, or LaB$_6$ etc.; a sulfide such as MoS$_2$, CdS, CuS, PbS, or ZnS etc.; a fluoride such as CaF$_2$ or BaF$_2$ etc.; and a combined ceramic such as TiCN etc.

Next, a method of manufacturing the half bearing 10 is described below. At first, a bimetal is formed by bonding the bearing alloy layer 12 onto a steel sheet constituting the back metal 11 by use of a sintering or pressure-bonding or the like. Next, the bimetal is cut into rectangular pieces, each of which pieces is then formed into a semi-cylindrical shape, and thereafter, the overlay layer 13 is formed on the surface of the bearing alloy layer 12 of the semi-cylindrically formed product. Then, a masking treatment is performed regarding the semi-cylindrically formed product with the exception of the rear face of the back metal 11, and thereafter the product is received within a dry type plating apparatus such as a sputtering apparatus or the like, and the ceramic coating 14 is provided on the rear face of the back metal 11. In this case, a temperature of the coating (, that is, a temperature within the sputtering apparatus) is between 150 and 500° C. Further, a period of time during which the ceramic is coated is controlled so that the ceramic coating 14 may have a thickness ranging from 0.05 to 5 µm, whereby the half bearing 10 is manufactured.

The ceramic coating has a low coefficient of friction. Since the half bearing 10 of this embodiment is provided on the rear face of the back metal thereof with the ceramic coating of a low friction, it is possible to obtain an excellent resistance to fretting. Further, the ceramic is hardly adhered to the metal, so that the fretting due to the adhesion hardly occurs. In addition, since the ceramic is very hard in hardness in comparison with the steel as shown in the following Table 1, it is hardly worn, so that it is possible to keep the excellent resistance to fretting for a long time.

TABLE 1

|  | HARDNESS (Hv) |
| --- | --- |
| TiN | 2200 |
| CrN | 2200 |
| TiCrN | 3300 |
| TiAlN | 2400 |
| STEEL | 1000 |

In the side of the inner face of the half bearing 10, a friction heat occurs between the inner face and the crank pin. The heat occurring in the inner face side is dissipated by a lubricating oil and by being transferred to the side of the large end portion 6 through the bearing alloy 12 and the back metal 11, whereby the half bearing 10 is cooled.

In this case, the thermal conductivity of the ceramic is low. Thus, in a case where the ceramic coating 14 is thick in thickness, the thermal conduction from the back metal 11 to the side of the connecting rod 1 is deteriorated, so that the heat-dissipation property of the half bearing 10 is lowered. However, since the ceramic coating 14 is hardly worn, it is possible to make the thickness thereof very thin. For example, it is sufficient that the thickness of the coating 14 ranges from 0.05 to 5 µm as described above, so that even in the case of the low thermal conductivity of the ceramic coating 14, there occurs no fear that the thermal conduction from the back metal 11 to the side of the connecting rod 1 is deteriorated, so that there is no fear of deteriorating the heat dissipation property of the half bearing 10.

According to the embodiment, the coating 14 made of the ceramic is provided on the rear face of the back metal 11, so that it is possible to obtain an improved resistance to fretting for a long period of time, and at the same time to obtain such an excellent effect as the thermal conduction from the back metal 11 to the side of the connecting rod 1 is not suppressed with the result that the heat dissipation of the half sliding bearing is not deteriorated although the ceramic low in thermal conductivity is used as the material of the coating 14.

The invention is not limited to the embodiment described above and shown in the drawings, and an expansion or a modification explained below may be employed.

The coating 14 may be provided not only on the rear face of the back metal 11 but also on the inner face of the large end portion 6 corresponding to the bearing housing.

The ceramic of the coating 14 may be one kind or may be a mixture of a plurality of kinds. Further, the overlay layer 13 may be provided on the surface of the bearing alloy layer 12 after providing the coating 14 on the rear face of the back metal 11.

The dry type plating for providing the ceramic coating on the rear face of the back metal 11 is not limited to the sputtering, and other means such as an ion plating, or an ion implantation, or a flame spray etc. may be used.

The present invention is described regarding the bearing apparatus for receiving the crank pin, however, the technical idea of the invention can be adopted to apparatus etc. other than the bearing apparatus.

What is claimed is:

1. A sliding bearing apparatus comprising:
   a sliding bearing provided with a back metal layer having an inner face and a rear face, and a bearing alloy layer provided on an inner face of said back metal layer; and
   a housing having an inner face on which said sliding bearing is mounted,
   the rear face of said back metal layer and/or the inner face of said housing being provided with a coating consisting essentially of a ceramic film.

2. A sliding bearing apparatus as claimed in claim 1, wherein said ceramic is at least one kind selected from the group consisting of a nitride, a carbide, an oxide, a boride, a sulfide and a fluoride.

3. A sliding bearing apparatus as claimed in claim 2, wherein a thickness of the ceramic coating ranges from 0.05 to 5 µm.

4. A sliding bearing apparatus as claimed in claim 3, wherein said sliding bearing apparatus is a bearing a crank pin of a connecting rod used in automobile engine.

5. A sliding bearing apparatus as claimed in claim 2, wherein said sliding bearing apparatus is a bearing a crank pin of a connecting rod used in automobile engine.

6. A sliding bearing apparatus as claimed in claim 1, wherein a thickness of the ceramic coating ranges from 0.05 to 5 µm.

7. A sliding bearing apparatus as claimed in claim 6, wherein said sliding bearing apparatus is a bearing a crank pin of a connecting rod used in automobile engine.

8. A sliding bearing apparatus as claimed in claim 1, wherein said sliding bearing apparatus is a bearing a crank pin of a connecting rod used in automobile engine.

9. A sliding bearing apparatus comprising:
   a sliding bearing provided with a back metal layer having an inner face and a rear face, and a bearing alloy layer provided on an inner face of said back metal layer; and
   a housing having an inner face on which said sliding bearing is mounted, the rear face of said back metal layer and/or the inner face of said housing being provided with a coating made of a ceramic, substantially free of components other than said ceramic.

10. A sliding bearing apparatus as claimed in claim 9, wherein said ceramic is at least one kind selected from the group consisting of a nitride, a carbide, an oxide, a boride, a sulfide and a fluoride.

11. A sliding bearing apparatus as claimed in claim 10, wherein a thickness of the ceramic coating ranges from 0.05 to 5 μm.

12. A sliding bearing apparatus as claimed in claim 11, wherein said sliding bearing apparatus is a bearing a crank pin of a connecting rod used in automobile engine.

13. A sliding bearing apparatus as claimed in claim 10, wherein said sliding bearing apparatus is a bearing a crank pin of a connecting rod used in automobile engine.

14. A sliding bearing apparatus as claimed in claim 9, wherein a thickness of the ceramic coating ranges from 0.05 to 5 μm.

15. A sliding bearing apparatus as claimed in claim 14, wherein said sliding bearing apparatus is a bearing a crank pin of a connecting rod used in automobile engine.

16. A sliding bearing apparatus as claimed in claim 9, wherein said sliding bearing apparatus is a bearing a crank pin of a connecting rod used in automobile engine.

17. A sliding bearing apparatus comprising:

a sliding bearing provided with a back metal layer having an inner face and a rear face, and a bearing alloy layer provided on an inner face of said back metal layer; and a housing having an inner face on which said sliding bearing is mounted, the rear face of said back metal layer and/or the inner face of said housing being provided with a ceramic film coating substantially free of components other then at least one of a nitride, a carbide, an oxide, a boride, a sulfide and a fluoride.

18. A sliding bearing apparatus as claimed in claim 17, wherein a thickness of the ceramic film coating ranges from 0.05 to 5 μm.

19. A sliding bearing apparatus as claimed in claim 18, wherein said sliding bearing apparatus is a bearing a crank pin of a connecting rod used in automobile engine.

20. A sliding bearing apparatus as claimed in claim 17, wherein said sliding bearing apparatus is a bearing a crank pin of a connecting rod used in automobile engine.

\* \* \* \* \*